Dec. 22, 1970     R. F. SYKES     3,548,504

SIGHTING DEVICE FOR ESTABLISHING A LINE OF SIGHT

Filed May 15, 1968     2 Sheets-Sheet 1

INVENTOR
RUSSELL F. SYKES

BY Bruns and Jenney
att'ys

Dec. 22, 1970 R. F. SYKES 3,548,504
SIGHTING DEVICE FOR ESTABLISHING A LINE OF SIGHT
Filed May 15, 1968 2 Sheets-Sheet 2

INVENTOR.
RUSSELL F. SYKES
BY Bruns and Jenney

United States Patent Office

3,548,504
Patented Dec. 22, 1970

3,548,504
SIGHTING DEVICE FOR ESTABLISHING A
LINE OF SIGHT
Russell F. Sykes, 303 Palmcrest Road,
North Syracuse, N.Y. 13212
Filed May 15, 1968, Ser. No. 729,292
Int. Cl. A63b 69/36; G01c 15/00
U.S. Cl. 33—46                                    1 Claim

ABSTRACT OF THE DISCLOSURE

A unitary sighting device has two spaced apart round sighting surfaces, the one nearer to the observer being substantially half the diameter of the farther surface. A base spaced from the farther sighting surface is adapted to be secured to any supporting surface. Means are provided for securing the base and sighting surfaces in spaced relation. The sighting surfaces are precisely axially aligned along a line of sight and the nearer surface is painted black and the farther is painted a brilliant luminescent orange for contrast enabling an observer to find the line of sight by centering the black exactly in the center of the orange.

BACKGROUND OF THE INVENTION

This invention relates to a device adapted to be attached to any supporting surface for establishing a line of sight in relation to that surface which is observable by a person remote from the device.

Such devices have been known for golf club heads but they have established the line of sight in one plane only and have not established the line in the other plane perpendicular thereto. Devices in firearms are also known for aligning the arm by a single front sight without the use of a rear sight. Such prior art devices have been inaccurate in that the line has been difficult to establish by viewing or an auxiliary light in the form of an electric lamp has been necessary.

SUMMARY OF THE INVENTION

The present invention contemplates two spaced, axially aligned sighting surfaces, preferably round in outline but which may be of similar superimposed regular geometric outlines, such as square. The surface nearer the viewer is black and the surface farther from the viewer is of a contrasting lighter color, preferably, a luminescent brilliant orange. The farther surface is about twice the width and height of the nearer surface so that the viewer may visually very accurately determine when the nearer is centered on the farther. The near and far sighting surfaces may be relatively closely spaced being separated by as little as the distance across the farther surface and, due to the contrasting colors, the surfaces may be aligned from a distance many times that transverse distance.

BRIEF DESCRIPTION OF THE DRAWINGS

FIGS. 8, 10, 11 and 12 are diagrammatic views of the sighting device showing positions requiring correction;

DESCRIPTION OF THE PREFERRED EMBODIMENTS

Figure 1:
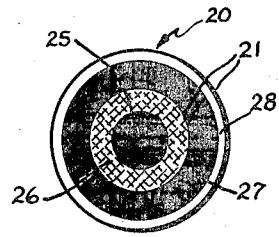
FIG. 1 is a plan view of a sighting device according to the invention.
Figure 2:
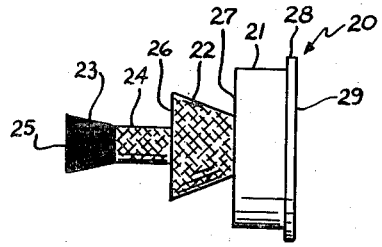
FIG. 2 is a side elevational view thereof.

In FIGS. 1 and 2, lined for color, a sighting device 20 has a base 21, a frusto-conical far sight section 22, and a frusto-conical near sight section 23 spaced from section 22 by the neck 24. The frusto-conical sections 22 and 23 each have their broad base surfaces faced in the direction of the viewer. The sight surface 25 of the near sight section 23 is nearer to the viewer and is spaced from the far sight surface 26 of section 22 by the reduced portion of section 23 and the neck 24. The far sight section is spaced from the background surface 27 of the base 21 by the reduced portion of section 22.

When viewed from the front, as shown in FIG. 1, all that is visible to the viewer is the near sight surface 25, the far sight surface 26, the background surface 27, and a flange 28 on the base formed to provide a forwardly facing shoulder. Sighting surfaces 25 and 26 are painted in contrasting colors. Preferably sight surface 25 and all of the near sight section 23 are painted a flat black. Sight surface 26 and all of far sight 22 and neck 24 are painted a brilliant luminescent orange. Background surface 27 of the base is also painted black for contrast.

The device 20 is preferably made from a single piece of metal precisely turned so that the surfaces 25 and 26 are axially aligned with base 21 and perpendicular to the flat bottom 29 of the base.

Figure 5:
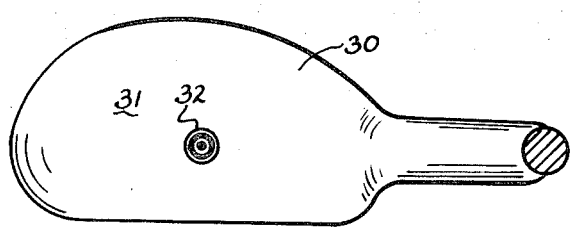
FIG. 5 is a fragmentary plan view of golf club equipped with the device of FIG. 1.
Figure 6:
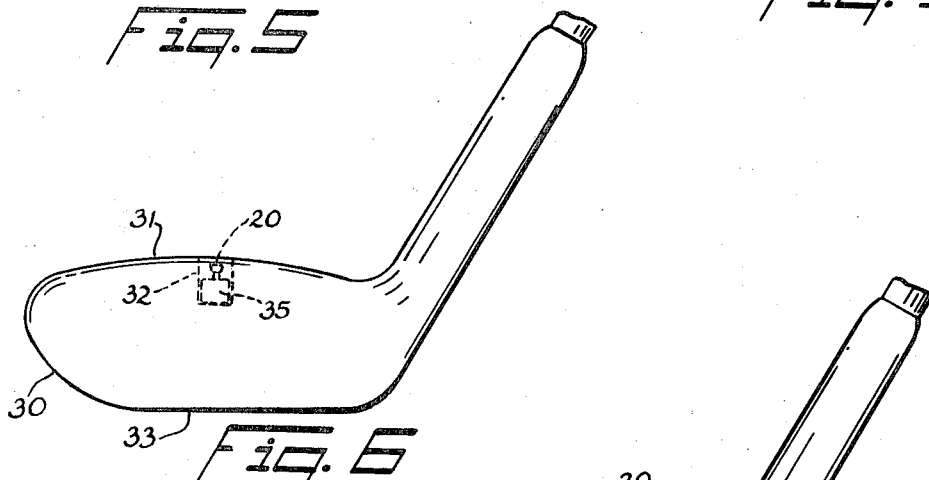
FIG. 6 is a front elevational view thereof.

In FIGS. 5 and 6 a conventional golf putter head 30 has a top surface 31 in which a hole 32 is bored back of the sweet-spot or center of the club face, the hole having a diameter substantially that of the flange 28 of device 20. The club head 30 has a conventional flat bottom surface 33 adapted to rest on or be held parallel with the putting surface and the hole 32 is bored perpendicular to this surface 33. The depth of the hole is substantially the axial length of device 20 so that all of the device may be contained in hole 32 and protected by the club head. The device 20 may be permanently secured in hole 32 by means of an epoxy cement.

Figure 3:
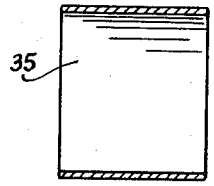
FIG. 3 is a transverse sectional view of a reflector for use with the device of FIG. 1.
Figure 4:
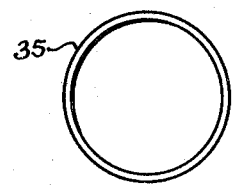
FIG. 4 is a plan view thereof.

Since the device 20 is sunk in the hole 32, for protection, a reflector 35, shown in FIGS. 3 and 4, is provided. The reflector is tubular, preferably a brass tube having its inner surface highly polished. The diameter of the reflector is such as to allow it to be slipped into the hole 32 around the base 21 with one end resting against the flange 28. Its length is such as to then bring its top end substantially above the far sight surface 26. It also may be permanently secured in place with epoxy cement.

Figure 7:
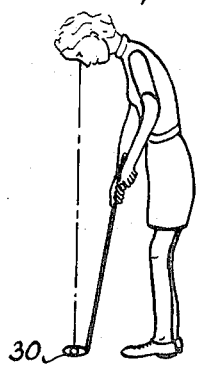
FIG. 7 is a diagrammatic view of the club of FIG. 5 in use.

In putting correctly, the aiming eye of the player, and everyone has one aiming eye, usually the right, should be directly over the ball in order that the line to the cup or hole can be aligned by eye without allowing for angles. When the club is grounded the eye of the player, as shown in FIG. 7, is exactly over the device 20 the near sight surface 25 will appear exactly in the center of the far sight surface 26, as shown in FIG. 1, the contrasting colors of sights 25 and 26 making this readily visible.

Figure 9:
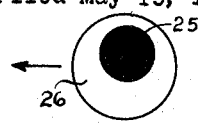
Figure 10:
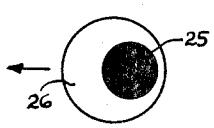
Figure 11:
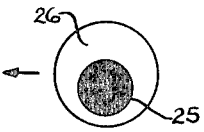
Figure 12:
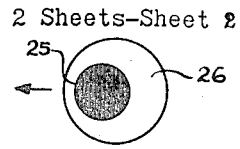

When the club head 30 is lifted from the ground for putting, any change in the inclination of the head is also readily apparent. FIGS. 9–12 have the direction of the putting stroke indicated by an arrow and show the appearance of the sighting device 20 when changes in inclination occur. FIG. 9 indicates that the heel of the club is up. FIG. 10 indicates that the face of the club is open or inclined upward. FIG. 11 indicates that the toe of the club is up and FIG. 12 indicates that the face of the club is closed.

The sighting device 20, therefore, indicates the proper position for the player's eye, and, therefore, his head, when the club is properly grounded. It also indicates any improper inclination of the club head while putting. Moreover, by giving the eye a relatively small object to focus upon, it assists the player in holding his head still while putting.

Figure 8:
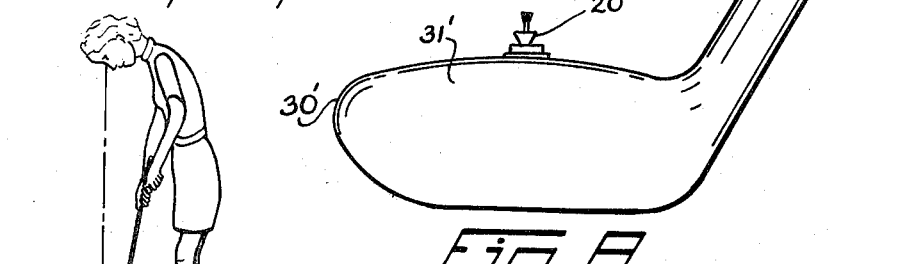
FIG. 8 is a fragmentary view of another club equipped in a different manner with the device of FIG. 1.

FIG. 8 illustrates another means for securing the device 20 on a club head 30' which does not have a hole bored in it. The device here is secured to the top surface 31' by a suitable adhesive and is positioned substantially as is the hole 32 in clubhead 30. Usually this method is used when the device is used as a training aid during practice and is not desired for actual play. In this case a reusable adhesive is preferred, such as "Holdit" manufactured by Eberhard Faber, Inc. of Wilkes-Barre, Pa.

It will be understood that the device 20 can also be of other material than metal, such as cast plastic or other material. The device may also be made in modified forms such as those shown in FIGS. 13 and 14.

Figure 13:
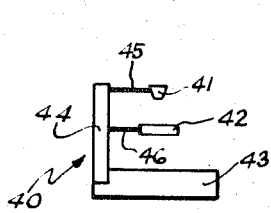
FIGS. 13 and 14 are elevational views of modified forms of the device.

The device 40, shown in FIG. 13, has a near sight 41, a far sight 42, both disk-like, and a base 43 held in spaced relationship by an upstanding post 44 secured to the base. Sights 41 and 42 are arranged in coaxial relationship to the base 43 by means of arms 45 and 46 which extend transversely from the post 44 to the sights 45 and 46, respectively. The sight surfaces of the two sights and the surface of the base may be painted or otherwise tinted in contrasting colors.

Figure 14:
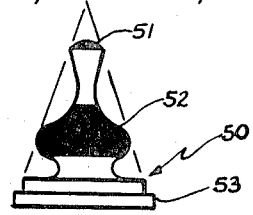

Device 50, shown in FIG. 14, has a near sight portion 51, a far sight portion 52 and a base 53. The surfaces seen by the viewer of sights 51 and 52 are curved. rather than flat and only that portion of each sight is colored, the colors being contrasting. The portions of device 50 connecting sight 51 to sight 52 and sight 52 to the base are also curved but are reduced in size from the sight portions nearer the viewer from the connecting portions. Device 50 may be hollow. Broken lines in FIG. 14 indicate the increasing diametrical size of the sight portions 51 and 52 and base portion 53, in that order.

Figure 15:
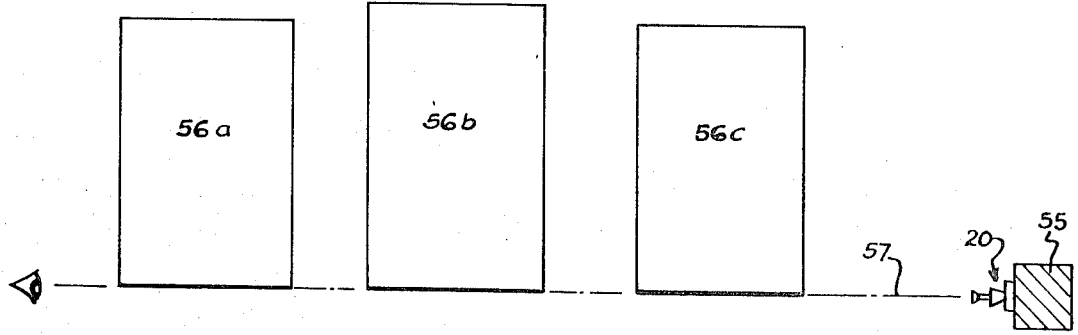
FIG. 15 is a diagrammatic view of the device of FIG. 1 mounted for another use.
Figure 17:
FIGS. 16 and 17 are exploded and plan views, respectively, of still another modified form of sighting device.
Figure 16:
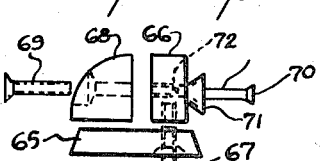
Figure 18:
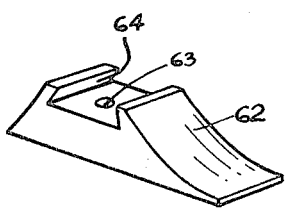
FIG. 18 is a support member for the device of FIG. 17.
Figure 19:
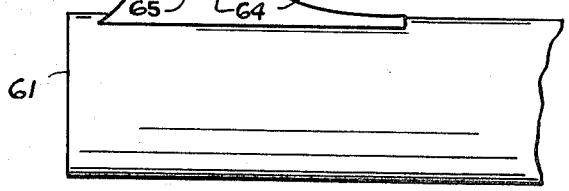
FIG. 19 is a fragmentary view of a gun barrel with the device of FIG. 17 mounted thereon.

FIG. 15 shows another use for the device 20 which is attached to an upstanding surface of a pillar 55 or a wall. A plurality of heavy machines such as 56a, 56b, and 56c are diagrammatically shown spaced apart on a shop floor, one end of each machine being aligned along a line of sight, indicated by the broken line 57, established by the device 20. Shifting of this heavy machinery may cause dangerous conditions, but any shifting may be quickly and easily detected by viewing along line 57 as indicated in FIG. 15. By sighting along the line indicated by centering the near sight in the far sight of device 20, the line may be established for again aligning the machines if it is found they have shifted.

Another modified form of sighting device 60 is shown in FIGS. 16, 17, 18 and 19 for use in a gun front sight to eliminate the need for a rear sight. At the front end of a gun barrel 61 (FIG. 19) a sight support 62 (FIG. 18) is secured by the usual screw through the hole 63. Support 62 has the usual dovetail way 64 thereacross in which a dovetail slide 65 is secured as by a drive fit. A conventional rectangular front sight 66 (FIG. 16), broader than the usual blade sight, is secured to slide 65 by the screw 67 and a conventional streamlined sight guard 68 is attachable, by means of screw 69, to the front of the front sight 66.

The device 60 is attached to the rear of sight 66 and, like sight 20, has a near sight surface 70 colored black and, spaced forwardly, a larger far sight surface 71 colored orange. Spaced forward of the surface 71 a pin portion 72 is secured by a drive fit in a cooperating hole in the front sight 66. The sighting surfaces 70 and 71 are axially aligned and the pin 72 and its hole cooperate to secure the axis of device 60 precisely normal to the rear surface of sight 66.

Device 60 is used to align the gun, the aiming of the gun being accomplished in the usual manner of holding the front sight 66 just below the spot it is desired that the bullet hit. By adjusting the gun so that the near sight surface 70 appears exactly in the center of the orange far sight surface 71, the shooter is assured that gun barrel 61 is aligned so as to be directed at the target spot appearing above the front sight. This has the advantage of the appearance of all the aiming aids at one point, the front sight, and eliminates the need of a rear sight which is relatively close to the shooter's eye and spaced from the front sight.

What is claimed is:
1. A sighting device adapted to be secured in a hole in the upper surface of a golf putter head for establishing a line of sight for the golfer directly above a portion of the putter head, comprising: a unitary elongated body having a round base section adapted to be secured in the hole and axially aligned round far and near sight sections, in that order, of successively smaller diameters, the said sections each being spaced from the next outer sections by connecting sections of less diameter than the next outer section, the base and near sight sections being painted a flat black color, the far sight section being painted a luminescent orange color, the base section having an annular outward flange at its bottom, and a reflector tube having a polished interior secured in the hole around the base section against the flange and extending beyond the far sight section toward the near sight section for reflecting light toward the far sight section.

References Cited

UNITED STATES PATENTS 1,349,277  8/1920  Honig _____ 33—46.5
3,042,409  7/1962  Johnson.

L. FORMAN, Primary Examiner

S. STEPHAN, Assistant Examiner

U.S. Cl. X.R.
273—183